(12) United States Patent  
Mahaney et al.

(10) Patent No.: US 8,763,433 B2  
(45) Date of Patent: Jul. 1, 2014

(54) LOCK RECEPTACLE ASSEMBLY

(75) Inventors: John C. Mahaney, Spencer, MA (US); Scott Brenner, Rutland, MA (US)

(73) Assignee: Inner-Tite Corp., Holden, MA (US)

( * ) Notice: Subject to any disclaimer, the term of this patent is extended or adjusted under 35 U.S.C. 154(b) by 255 days.

(21) Appl. No.: 12/909,491

(22) Filed: Oct. 21, 2010

(65) Prior Publication Data

US 2012/0096906 A1 Apr. 26, 2012

(51) Int. Cl.
*E05B 67/36* (2006.01)

(52) U.S. Cl.
USPC .................................................. 70/34; 70/14

(58) Field of Classification Search
USPC ........................... 70/14, 32–34, 175–178, 180
See application file for complete search history.

(56) References Cited

U.S. PATENT DOCUMENTS

| | | | | |
|---|---|---|---|---|
| 3,406,708 A * | 10/1968 | Maydock | | 70/180 |
| 4,152,909 A * | 5/1979 | Lundberg | | 70/34 |
| 4,193,276 A * | 3/1980 | Lundberg | | 70/34 |
| 4,637,234 A * | 1/1987 | Mielonen | | 70/34 |
| 4,971,289 A * | 11/1990 | Pietras | | 70/180 |
| 5,960,653 A * | 10/1999 | DeWalch et al. | | 70/34 |
| 6,543,260 B2 * | 4/2003 | Koy et al. | | 70/34 |
| 6,575,000 B1 * | 6/2003 | Li | | 70/34 |
| 6,862,905 B2 * | 3/2005 | Zapushek | | 70/34 |
| 6,913,413 B2 * | 7/2005 | Yang | | 70/34 |
| 7,353,671 B2 * | 4/2008 | Recknagel et al. | | 70/34 |
| 2005/0000255 A1 * | 1/2005 | Wyers | | 70/34 |

* cited by examiner

*Primary Examiner* — Christopher Boswell
(74) *Attorney, Agent, or Firm* — McCormick, Paulding & Huber LLP

(57) ABSTRACT

A lock receptacle assembly having a body portion having a first end that includes a bore configured to receive a lock, an end cap removably securable to the first end of the body portion. The end cap having a through bore to allow passage of the lock, such that, when assembled, the lock can lock the end cap and the body portion together. The end cap interlocks with the first end of the body portion so that there is substantially no load on the lock when axial force is applied to the assembly.

17 Claims, 4 Drawing Sheets

LOCK RECEPTACLE ASSEMBLY

FIELD OF THE INVENTION

The present invention relates generally to a lock receptacle assembly and more particularly to a barrel lock receptacle assembly that includes a tamper resistance lock receptacle.

BACKGROUND OF THE INVENTION

Utilities, such as gas, are provided to customers through lines that include valves. These valves, which are commonly referred to as "stops" or "cocks," are used to control the flow of gas through the line. Such valves are well known and generally include a body portion having an inlet and outlet that are separated by a rotatable plug. The plug has a handle or knob that may be rotated to control fluid flow.

As will be appreciated, it is generally desirable to secure such valves so that they cannot be opened to provide gas to an unauthorized customer. Typically, securing such valves involves partially enclosing the valve with a shroud or cover so that the valve cannot be accessed. The cover is secured in place over the valve with, for example, a barrel lock.

In a known lock assembly, a protective cover is secured over a gas valve with a post or pin that includes a barrel lock receptacle. The pin is secured to the protective cover by the barrel lock and a cap. In particular, the barrel lock secures the cap to the pin and prevents removal of the protective cover from the valve. While such assemblies are generally effective, they may present durability issues when tampered with. For example, a pry bar may be used to put force directly on the balls of the barrel lock within the pin. If enough force is applied, the balls of the barrel lock may shear or deform allowing the cap, pin and protective cover to be removed.

As will be appreciated, a lock assembly that provides an enhanced degree of tamper resistance is desirable.

SUMMARY OF THE INVENTION

It is an object of the present invention to provide a lock receptacle assembly.

It is an additional object of the present invention to provide a lock receptacle assembly that is highly tamper resistant.

It is an additional object of the present invention to provide a lock receptacle assembly that is easy to install and remove.

It is an additional object of the present invention to provide a lock receptacle assembly that may be easily manufactured.

An embodiment of the inventive lock receptacle assembly includes a body portion having a first end that includes a bore configured to receive a lock, an end cap removably securable to the first end of the body portion. The end cap having a through bore to allow passage of the lock, such that, when assembled, the lock can lock the end cap and the body portion together. The end cap interlocks with the first end of the body portion so that there is substantially no load on the lock when axial force is applied to the assembly.

An addition embodiment of the present invention is a valve lock assembly that includes a cover configured to be placed over a utility valve, the cover having two opposed side-walls each of which includes an aperture. The embodiment further includes a lock receptacle assembly having a body portion and an end cap, the body portion is configured to be placed through each of the cover apertures to prevent removal of the cover from a utility valve. The assembly further includes a lock for selectively securing the body portion to the end cap when assembled. The end cap interlocks with the body portion so that there is substantially no load on the lock when axial force is applied to the assembly.

DETAILED DESCRIPTION OF THE INVENTION

Figure 1:
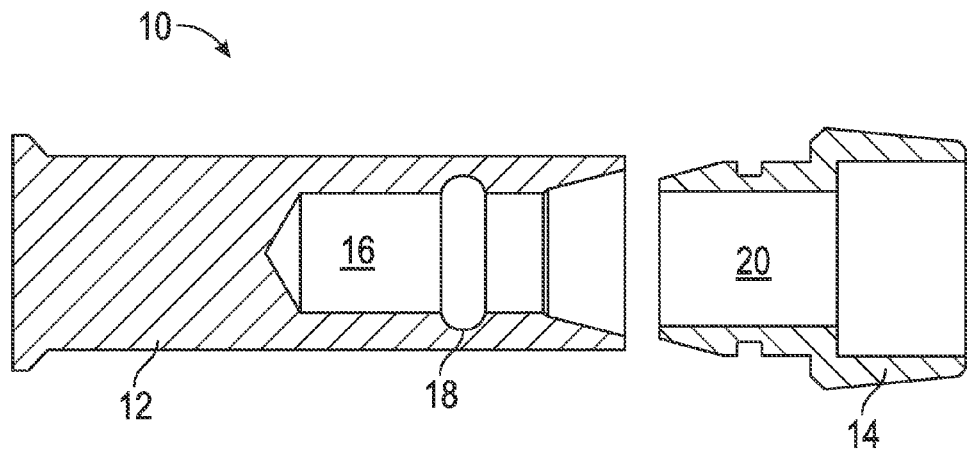
FIG. 1 is a sectioned side view of a barrel lock receptacle assembly of a prior art valve protector assembly.
Figure 2:
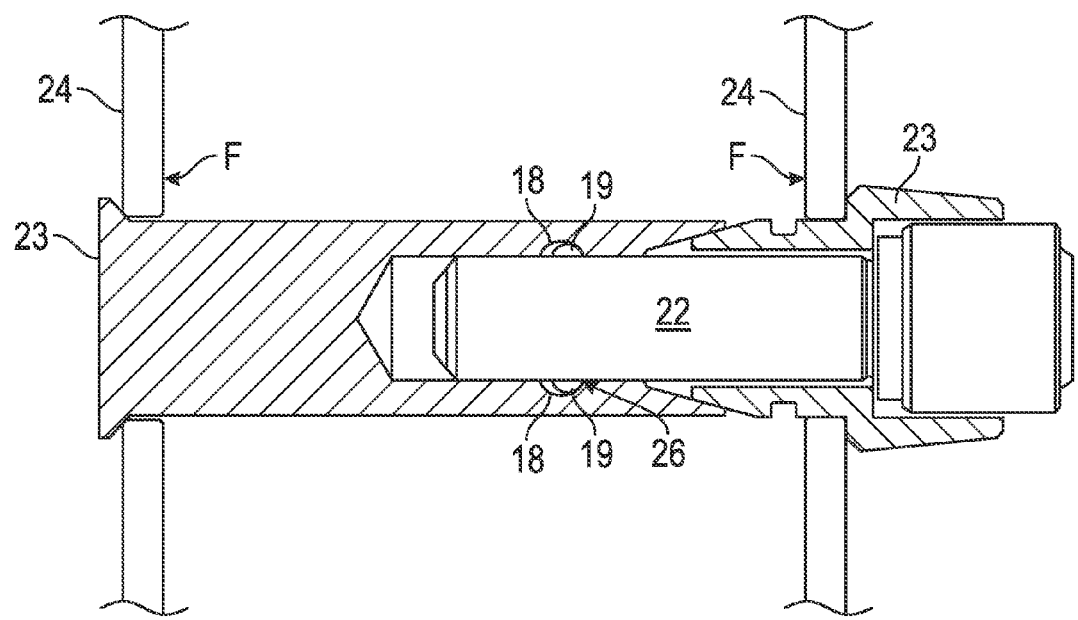
FIG. 2 is an additional sectioned side view of the barrel lock receptacle assembly of FIG. 1.

FIGS. 1-2 depict a known barrel lock receptacle assembly 10 used to secure meter valves. In use, the receptacle assembly 10 is placed through apertures in side-walls 24 of a shroud or cover to secure the cover over a valve. A barrel lock 22 is used to secure the receptacle assembly 10 to the cover to prevent removal. In particular, the assembly 10 includes a cylindrical post 12 and a cap 14. The post 12 includes a bore 16 that is configured to receive the barrel lock 22. The bore 16 has an annular recess 18 that accepts balls 19 of the barrel lock 22 to secure the lock 22 within the post 12.

The cap 14 has a through bore 20 that allows the barrel lock 22 to pass through the cap 14 and into the post bore 16 to secure the post and cap together. As shown, the cap 14 and pin have shoulder portions 23 that prevent movement of the assembly 10 relative to the walls 24 of the cover. While such assemblies are generally effective, when pried with a pry bar, force F is directed to the balls of the barrel lock. As will be appreciated, in certain circumstances it may be possible for the balls 19 to shear or deform against the annular recess 18 allowing the cap 14 to separate from the post 12 and the cover to be removed from the valve. As discussed below, an embodiment of the present invention addresses the potential issue.

Figure 3:
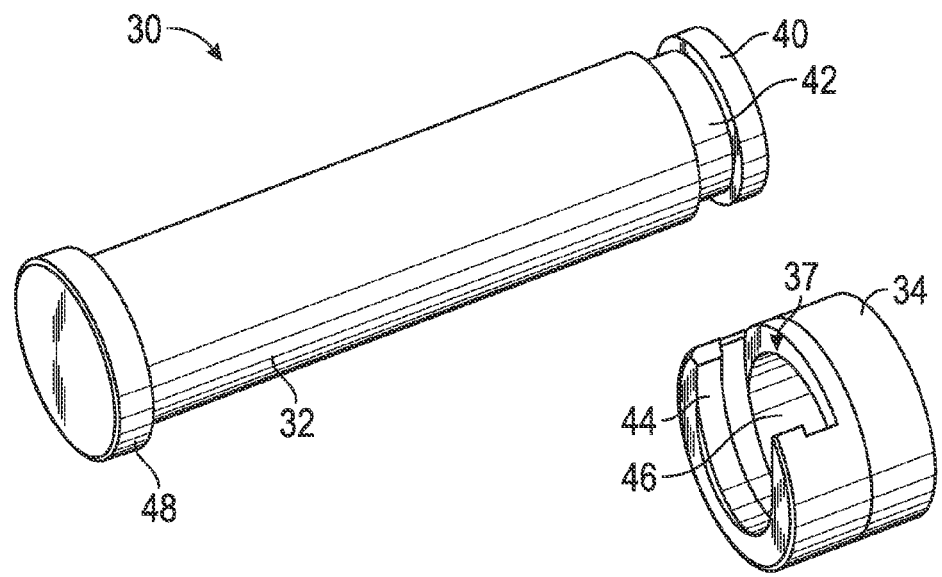
FIG. 3 is a perspective view of a lock receptacle assembly in accordance with an embodiment of the present invention.
Figure 4:
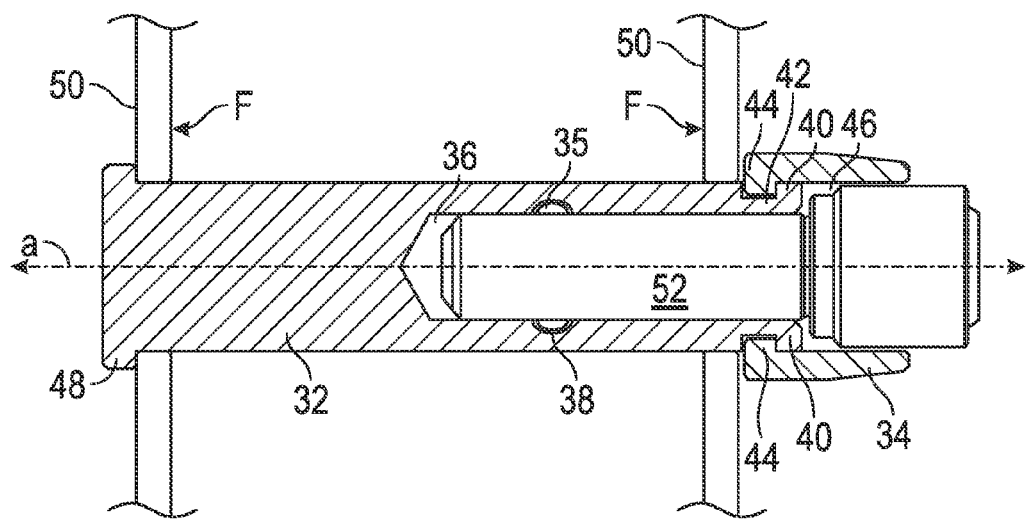
FIG. 4 is a sectioned side view of the lock receptacle assembly of FIG. 3.
Figure 5:
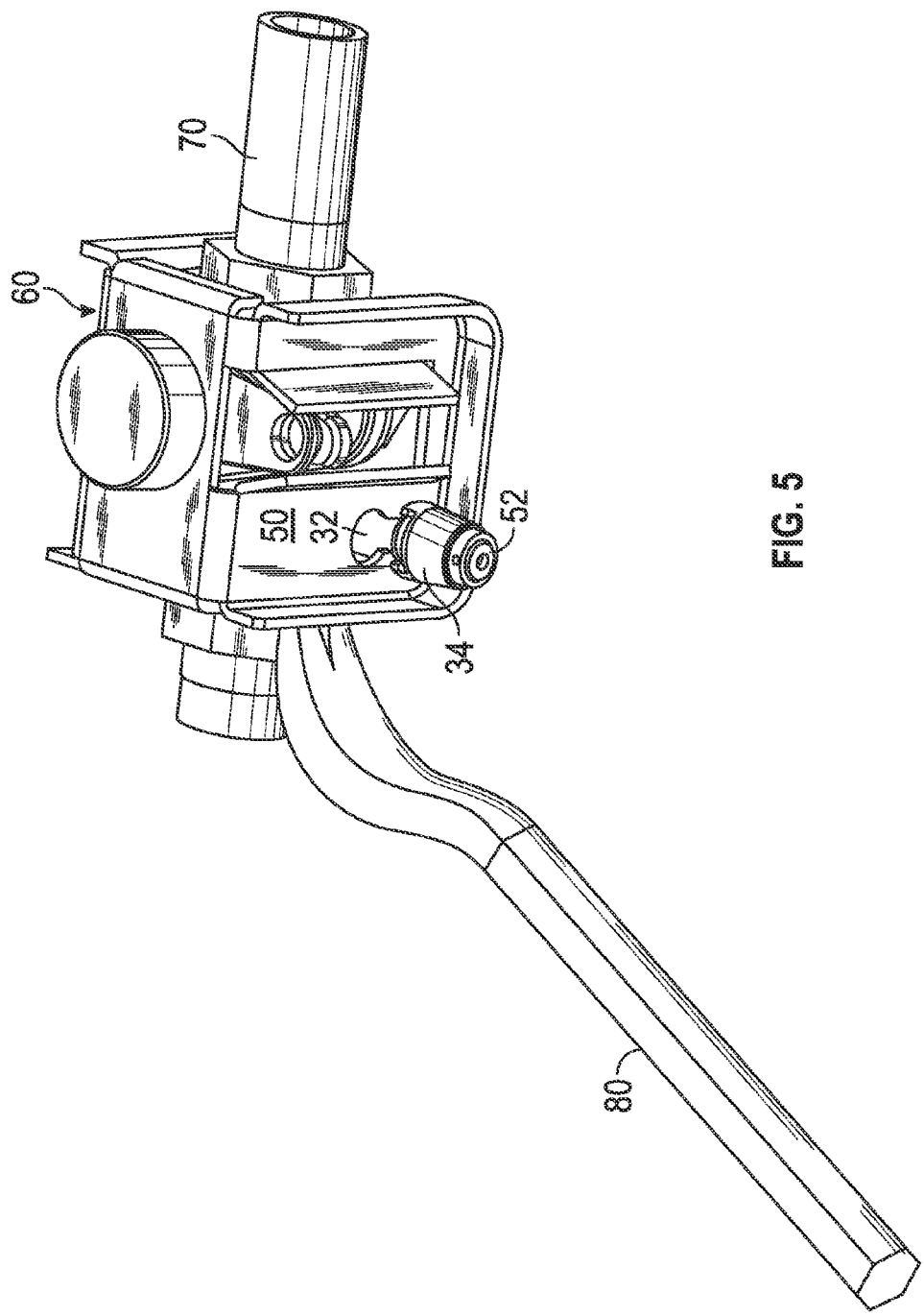
FIG. 5 perspective view of an assembled valve lock assembly incorporating the lock receptacle assembly of FIG. 3.

Turning now to FIGS. 3-5, an embodiment of the present invention provides a lock receptacle assembly 30 with an interlocking body 32 and end cap 34. This interlocking structure directs force F to the interlocked surfaces of the body portion 32 and end cap 34 and not to the balls 35 of a lock, e.g., a barrel lock 52.

More specifically, the assembly 30 includes a body portion 32. The body portion 32 has a first end that includes a bore 36 for receiving the barrel lock 52. The bore 36 includes a recess 38 for the balls 35 of the barrel lock 52. The first end of the body portion 32 also includes a channel 42 having a reduced profile or diameter if the body is cylindrical. The channel 42 is formed in the body portion 32 such that it creates a shoulder 40, which interlocks with the end cap 34 when assembled as described herein.

The body portion 32 also includes a second opposite end, which features a flange 48. The flange 48 abuts against a side-wall 50 of a cover 60. The flange 48 prevents passage of the body portion 32 through an aperture in the side-wall 50 to secure the cover 60 over a valve 70.

As stated, the assembly 30 also includes an end cap 34. The end cap 34 has a though bore 46 that allows the barrel lock 52 to be inserted through the cap 34. The though bore 46 of the end cap 34 further includes a lip 44 that mateingly engages the shoulder 40 of the body portion 32 to interlock the end cap 34 and body portion 32.

The end cap 34 also features an open mounting aperture or slot 37 formed in a side of the cap 34. The mounting slot 37 is configured to receive the channel 42 and shoulder 40 of the body portion 32 such that the lip 44 mateingly engages the shoulder 40. The barrel lock is then placed through the end cap 34 and into the body 32 and secured in place by having the balls 35 extend into the recess 38.

In use, the cover 60 is first placed over a valve 70. The body portion 32 is the inserted through an opening or aperture in the side wall 50 of the cover 60 until the flange 48 abuts the side-wall and the first end of the body 32 extends through an aligned aperture in the opposite side-wall 50 of the cover 60. The end cap 34 is then placed on the body portion 32 and locked in place via the barrel lock 52.

Importantly, when the aforementioned embodiment is pried with a pry bar, as illustrated in FIGS. 4 and 5, the axial force F is not directed to the balls 35 of the barrel lock 52. Indeed, the force F is directed to the interlocked shoulder 40 and lip 44. As will be appreciated, this configuration yields a stronger, more tamper resistant barrel lock receptacle assembly than presently known. "Axial force" as used herein refers to force substantially parallel to axis A of the body portion 32.

Figure 6:
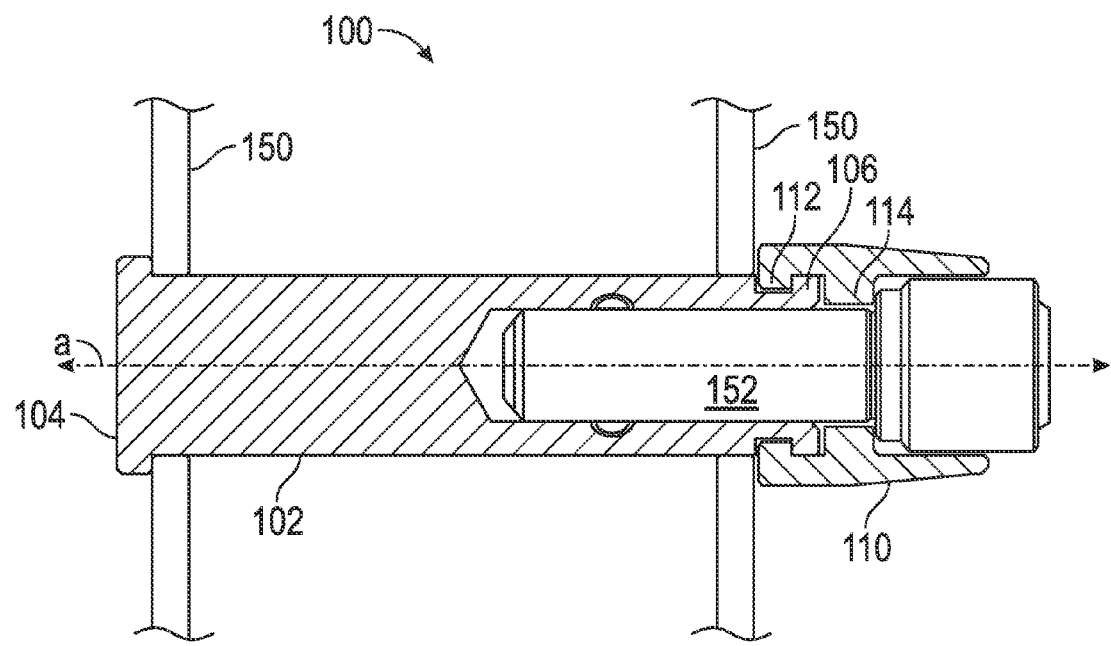
FIG. 6 is a sectioned side view of a lock receptacle assembly in accordance with an alternative embodiment of the present invention.
Figure 7:
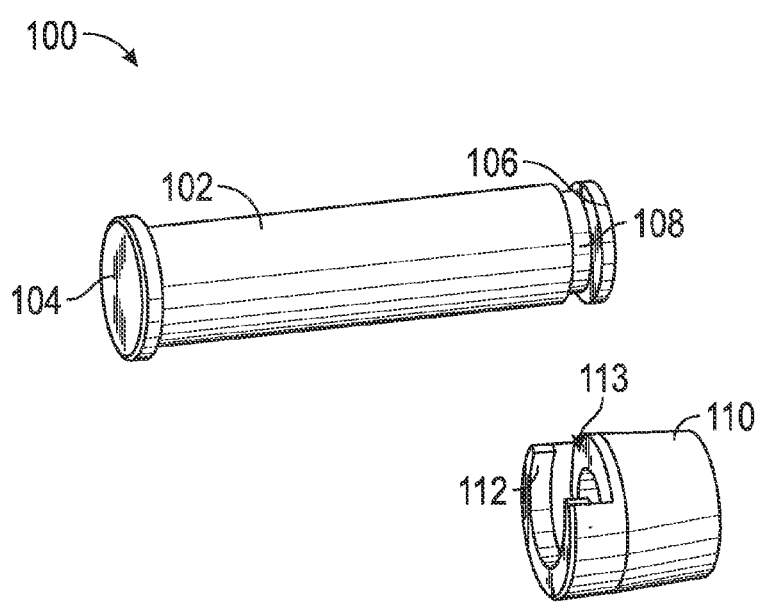
FIG. 7 is a perspective view of the lock receptacle assembly of FIG. 6.

Referring now to FIGS. 6 and 7, an alternative embodiment of the present invention is depicted. In this embodiment, the interior of the end cap 110 includes an additional lip 114. In this embodiment, the shoulder 106 of the body 102 sits between lip 112 and lip 114 when assembled.

In either of the embodiments described herein, the end cap and body portion may be manufactured from any suitable durable material, e.g., a hardened steel. As will be appreciated, the body portion and end cap may be manufactured in a variety of shapes and need not be cylindrical.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A lock receptacle assembly, said assembly comprising:
 a body portion having a first end having a shoulder and a bore configured to receive a lock, and a second end opposite said first end, said body portion defining a longitudinal axis of said lock receptacle assembly; and
 an end cap having a slot formed in a peripheral surface thereof for facilitating insertion of said shoulder of said body portion into said slot in a direction substantially transverse to said longitudinal axis to removably secure said end cap to said first end of said body portion, said end cap having a through bore to allow passage of said lock, such that, when assembled, said lock can lock said end cap and said body portion together;
 wherein said end cap is freely rotatable 360 degrees relative to said body portion when said shoulder of said body portion is received in said slot of said end cap; and
 wherein said end cap interlocks with said first end of said body portion so that there is substantially no load on said lock when axial force is applied to said end cap in a direction substantially parallel to said longitudinal axis and away from said second end of said body portion.

2. The lock receptacle assembly of claim 1, wherein said second end includes a flange portion.

3. The lock receptacle assembly of claim 1, wherein said through bore of said end cap includes a lip which interlocks with said shoulder of said body portion so that there is substantially no load on said lock when axial force is applied to said assembly.

4. The lock receptacle assembly of claim 1, wherein said bore of said body portion includes a recess configured to received balls of said lock to prevent removal of said lock from body portion.

5. The lock receptacle assembly of claim 1, wherein said body portion and said end cap are manufactured from hardened steel.

6. The lock receptacle assembly of claim 1, wherein said body portion and said end cap are cylindrical.

7. The lock receptacle assembly of claim 1, wherein said lock is a barrel lock.

8. A valve lock assembly, said valve lock assembly comprising:

a cover configured to be placed over a utility valve, said cover having two opposed side-walls each of which includes an aperture;

a lock receptacle assembly having a body portion defining a longitudinal axis and an end cap, said body portion is configured to be placed through each of said cover apertures to prevent removal of said cover from a utility valve, said body portion is also configured to receive a lock, said body portion having a shoulder and said end cap having a slot formed in a peripheral surface thereof and confiured to receive said shoulder of said body portion when said shoulder is inserted into said slot in a direction substantially transverse to said longitudinal axis; and a lock, said lock selectively securing said body portion to said end cap after said shoulder is received in said slot;

wherein said end cap is freely rotatable 360 degrees relative to said body portion when said shoulder of said body portion is received in said slot of said end cap; and wherein said end cap interlocks with said body portion so that there is substantially no load on said lock when axial force is applied to said body portion in a direction substantially parallel to said longitudinal axis and away from said end cap.

9. The valve lock assembly of claim 8, wherein said body portion further comprises:

a first end and a second end opposite said first end, said second end including a flange portion to prevent removal of said body portion through said apertures.

10. The valve lock assembly of claim 9, wherein said first end of said body portion includes said shoulder.

11. The valve lock assembly of claim 10 wherein said end cap includes a through bore having a lip which interlocks with said shoulder of said body portion so that there is substantially no load on said lock when axial force is applied to said assembly.

12. The valve lock assembly of claim 8, wherein said body portion includes a bore to receive said lock, said bore having a recess configured to received balls of said lock to prevent removal of said lock from body portion.

13. The valve lock assembly of claim 8, wherein said lock is a barrel lock.

14. The valve lock assembly of claim 8, wherein said cover, body portion and said end cap are manufactured from hardened steel.

15. The valve lock assembly of claim 8, wherein said body portion and said end cap are cylindrical.

16. A lock receptacle assembly, said assembly comprising:

a body portion having a first end that includes a shoulder and a bore configured to receive a lock, said body portion definingitudinal axis of said lock receptacle assembly;

an end cap removably securable to said first end of said body portion, said end cap having a through bore to allow passage of said lock, such that, when assembled, said lock can lock said end cap and said body portion together, said through bore of said end cap including a lip;

wherein said end cap is rotatable 360 degrees relative to said body portion when said end cap is interlocked with said body portion; and wherein said lip of said end cap interlocks with said shoulder of said body portion so that there is substantially no load on said lock when a tensile axial force in a direction substantiall arallel to said longitudinal axis is applied to said end cap.

17. The lock receptacle assembly of claim 16, wherein said end cap includes a mounting aperture which allows said end cap to be mounted on said body portion so that said end cap and body portion are interlocked.

* * * * *

UNITED STATES PATENT AND TRADEMARK OFFICE
CERTIFICATE OF CORRECTION

PATENT NO. : 8,763,433 B2  
APPLICATION NO. : 12/909491  
DATED : July 1, 2014  
INVENTOR(S) : John C. Mahaney and Scott Brenner Page 1 of 1

It is certified that error appears in the above-identified patent and that said Letters Patent is hereby corrected as shown below:

In the Claims:

Claim 8, column 5, line 10, the word "confiured" should be "configured".

Claim 16, column 6, line 16, the word "definingitudinal" should be "defining a longitudinal".
Claim 16, column 6, line 29, the words "substantiall arallel" should be "substantially parallel".

Signed and Sealed this
Sixteenth Day of September, 2014

Michelle K. Lee
*Deputy Director of the United States Patent and Trademark Office*